US012787143B2

(12) United States Patent
Hiratani et al.

(10) Patent No.: US 12,787,143 B2
(45) Date of Patent: Nov. 3, 2026

(54) LIGHTING DEVICE, LIGHTING SYSTEM, AND METHOD FOR CONTROLLING LIGHTING DEVICE

(71) Applicant: Panasonic Intellectual Property Management Co., Ltd., Osaka (JP)

(72) Inventors: Kosuke Hiratani, Osaka (JP); Shintaro Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 33 days.

(21) Appl. No.: 18/998,680

(22) PCT Filed: Aug. 29, 2023

(86) PCT No.: PCT/JP2023/031320
§ 371 (c)(1),
(2) Date: Jan. 27, 2025

(87) PCT Pub. No.: WO2024/048606
PCT Pub. Date: Mar. 7, 2024

(65) Prior Publication Data

US 2026/0025896 A1 Jan. 22, 2026

(30) Foreign Application Priority Data

Aug. 31, 2022 (JP) ................................ 2022-138476

(51) Int. Cl.
*H05B 47/175* (2020.01)
*F21S 8/04* (2006.01)
(Continued)

(52) U.S. Cl.
CPC ......... *H05B 47/1985* (2024.01); *H05B 45/10* (2020.01); *H05B 45/20* (2020.01);
(Continued)

(58) Field of Classification Search
CPC ........ H05B 45/56; H05B 45/10; H05B 45/50; H05B 45/52
See application file for complete search history.

(56) References Cited

U.S. PATENT DOCUMENTS

| | | | | |
|---|---|---|---|---|
| 9,974,135 | B1 | 5/2018 | Nelson et al. | |
| 2010/0060194 | A1 | 3/2010 | Furry et al. | |
| 2013/0063042 | A1 * | 3/2013 | Bora | H05B 45/10 315/292 |

(Continued)

FOREIGN PATENT DOCUMENTS

| | | | |
|---|---|---|---|
| JP | 2010-509726 | A | 3/2010 |
| JP | 2019-523906 | A | 8/2019 |

(Continued)

OTHER PUBLICATIONS

International Search Report dated Oct. 10, 2023 issued in International Patent Application No. PCT/JP2023/031320, with English translation.

*Primary Examiner* — Wei (Victor) Y Chan
(74) *Attorney, Agent, or Firm* — Rimon P.C.

(57) ABSTRACT

A lighting device includes: a light source that includes a plurality of light emitting elements arranged in a two-dimensional array; a communicator that acquires a control command by communicating with a control device; a driving circuit that drives the light source based on the control command acquired by the communicator; and a projection lens that projects light emitted from the light source driven by the driving circuit as illumination light. The control command includes pair information that includes: a tag that indicates a parameter of the illumination light; and a specific value of the parameter indicated by the tag. The parameter is any one of a shape, a position, a size, a color, or a brightness of a lighting region to be illuminated by the illumination light, or a time-varying factor related to at least one of these.

11 Claims, 6 Drawing Sheets

(51) Int. Cl.

| | |
|---|---|
| ***F21Y 105/16*** | (2016.01) |
| ***F21Y 115/10*** | (2016.01) |
| ***H05B 45/10*** | (2020.01) |
| ***H05B 45/20*** | (2020.01) |
| ***H05B 47/135*** | (2020.01) |
| ***H05B 47/155*** | (2020.01) |
| ***H05B 47/16*** | (2020.01) |
| ***H05B 47/19*** | (2020.01) |

(52) U.S. Cl.
CPC ......... *H05B 47/135* (2020.01); *H05B 47/155* (2020.01); *H05B 47/16* (2020.01); *H05B 47/19* (2020.01); *H05B 47/1965* (2024.01); *F21S 8/04* (2013.01); *F21Y 2105/16* (2016.08); *F21Y 2115/10* (2016.08)

(56) References Cited

U.S. PATENT DOCUMENTS

| | | | | |
|---|---|---|---|---|
| 2014/0343699 | A1* | 11/2014 | Engelen | F21V 14/02 700/90 |
| 2015/0003084 | A1* | 1/2015 | Eichel | F21V 21/14 362/419 |
| 2015/0048233 | A1* | 2/2015 | Dumas | F16M 11/32 248/125.7 |
| 2015/0084514 | A1* | 3/2015 | Anthony | H05B 47/175 315/131 |
| 2015/0345762 | A1* | 12/2015 | Creasman | H05B 45/00 362/428 |
| 2016/0178991 | A1* | 6/2016 | Wan | H04N 23/61 362/11 |
| 2017/0009969 | A1* | 1/2017 | Conti | F21V 21/15 |
| 2017/0068237 | A1* | 3/2017 | Yamaguchi | H04W 4/029 |
| 2017/0138730 | A1* | 5/2017 | Ohtomo | G01S 7/4972 |
| 2018/0051869 | A1* | 2/2018 | Belliveau | F21V 21/15 |
| 2021/0142700 | A1 | 5/2021 | Peterson et al. | |

FOREIGN PATENT DOCUMENTS

| | | | |
|---|---|---|---|
| JP | 2020-095963 | A | 6/2020 |
| WO | 2008/059445 | A2 | 5/2008 |
| WO | 2017/210221 | A1 | 12/2017 |

* cited by examiner

LIGHTING DEVICE, LIGHTING SYSTEM, AND METHOD FOR CONTROLLING LIGHTING DEVICE

CROSS-REFERENCE TO RELATED APPLICATIONS

This application is the U.S. National Phase under 35 U.S.C. § 371 of International Patent Application No. PCT/JP2023/031320, filed on Aug. 29, 2023, which in turn claims the benefit of Japanese Patent Application No. 2022-138476, filed on Aug. 31, 2022, the entire disclosures of which Applications are incorporated by reference herein.

TECHNICAL FIELD

The present invention relates to a lighting device, a lighting system, and a method for controlling a lighting device.

BACKGROUND ART

Devices that include a light source including a plurality of light emitting diodes (LEDs) and can cause the light source to emit light in predetermined patterns are known (see, for example, Patent Literatures (PTLs) 1 and 2).

CITATION LIST

Patent Literature

[PTL 1]
Japanese Unexamined Patent Application Publication (Translation of PCT Application) No. 2019-523906
[PTL 2]
Japanese Unexamined Patent Application Publication No. 2020-95963

SUMMARY OF INVENTION

Technical Problem

In order to cause a light source that includes a plurality of LEDs to emit light in a predetermined pattern, it is necessary to control each of the plurality of LEDs. For controlling each of the plurality of LEDs, for example, a control command may be transmitted in the form of an image, the control command being a command in which light illumination and light extinction of each of the plurality of LEDs are expressed in a bitmap. In this case, however, there is a problem in that a large amount of communication data is required.

Alternatively, values related to the position, the size, and the like of the plurality of LEDs to be illuminated may be encoded in a predetermined order, and transmitted. In this case, however, although the amount of communication data may be reduced, this configuration cannot cope with future needs that may arise where complicated graphics, letters, or characters need to be expressed in lighting regions. As described above, there is a problem in that it is not possible to achieve both reduction of the amount of communication data required to control the light source and a high level of flexibility to change of lighting regions.

To address this, it is an object of the present invention to provide a lighting device, a lighting system, and a method for controlling a lighting device, with which it is possible to reduce the amount of communication data required to control the light source and is highly flexible to change of lighting regions.

Solution to Problem

A lighting device according to one aspect of the present invention includes: a light source that includes a plurality of light emitting elements arranged in a two-dimensional array; a communicator that acquires a control command by communicating with a control device; a driving circuit that drives the light source based on the control command acquired by the communicator; and a projection lens that projects light emitted from the light source driven by the driving circuit as illumination light, wherein the control command includes pair information that includes: a tag that indicates a parameter of the illumination light; and a specific value of the parameter indicated by the tag, and the parameter is any one of a shape, a position, a size, a color, or a brightness of a lighting region to be illuminated by the illumination light, or a time-varying factor related to at least one of the shape, the position, the size, the color, or the brightness of the lighting region to be illuminated by the illumination light.

Also, a lighting system according to one aspect of the present invention includes the lighting device according to the one aspect of the present disclosure and the control device.

Also, a method for controlling a lighting device according to one aspect of the present invention includes: acquiring a control command by communicating with a control device; and causing the driving circuit to drive the light source based on the control command acquired, wherein the control command includes pair information that includes: a tag that indicates a parameter of the illumination light; and a specific value of the parameter indicated by the tag, and the parameter is any one of a shape, a position, a size, a color, or a brightness of a lighting region to be illuminated by the illumination light, or a time-varying factor related to at least one of the shape, the position, the size, the color, or the brightness of the lighting region to be illuminated by the illumination light.

Also, one aspect of the present invention can be implemented as a program that causes a computer to execute the method for controlling a lighting device described above. Alternatively, one aspect of the present invention can also be implemented as a computer-readable non-transitory recording medium in which the program is recorded.

Advantageous Effects of Invention

According to the present invention, it is possible to provide a lighting device, a lighting system, and a method for controlling a lighting device, with which it is possible to reduce the amount of communication data required to control the light source and is highly flexible to change of lighting regions.

DESCRIPTION OF EMBODIMENTS

Figure 1:
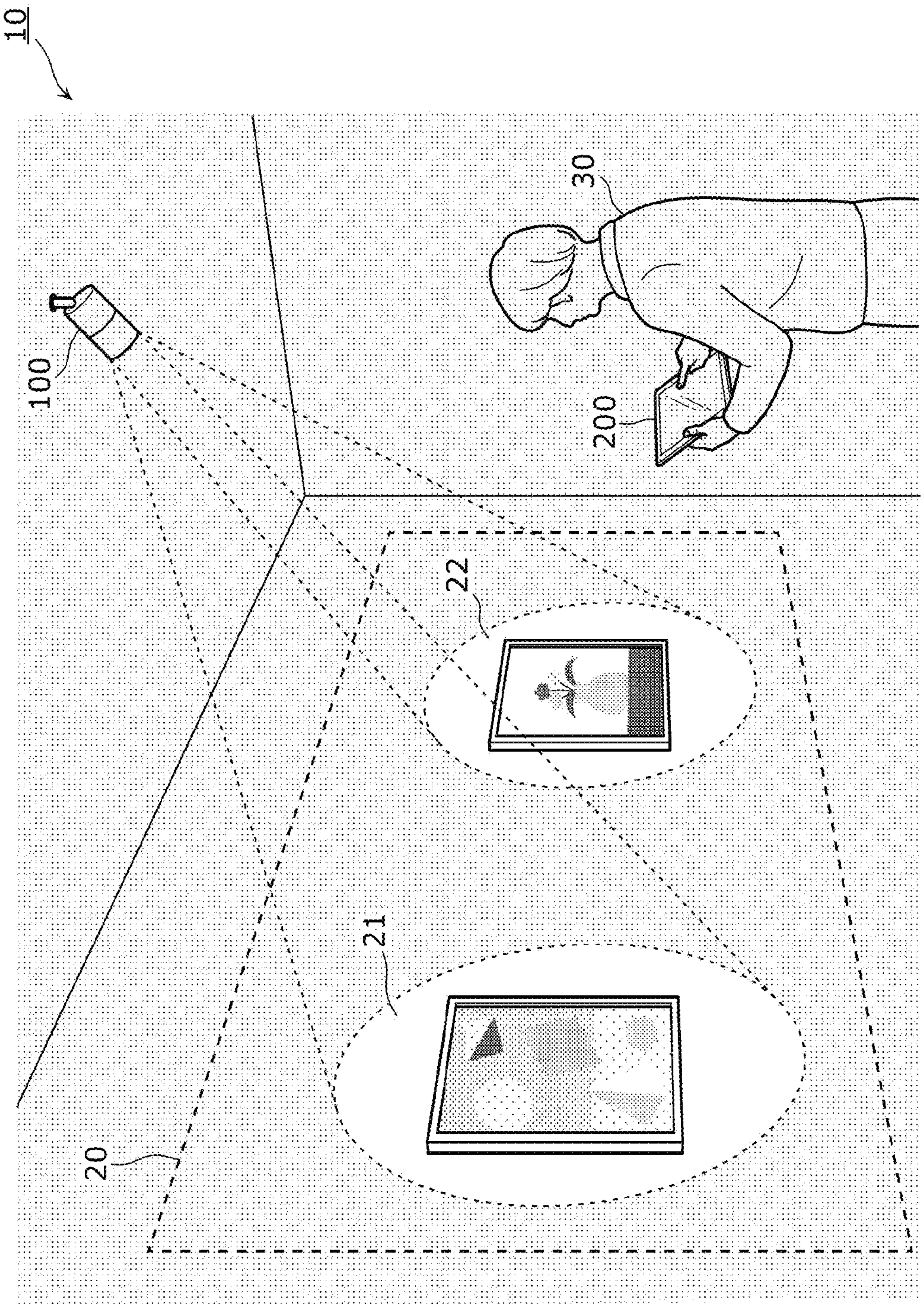
FIG. 1 is a diagram showing a usage state of a lighting system according to an embodiment.

Hereinafter, a lighting device, a lighting system, and a method for controlling a lighting device according to an embodiment of the present invention will be described in detail with reference to the accompanying drawings. The embodiment described below is merely a specific example of the present invention. Accordingly, the numerical values, shapes, materials, structural elements, the arrangement and connection of the structural elements, steps, the order of the steps, and the like shown in the following embodiment are merely examples, and therefore are not intended to limit the scope of the present invention. Accordingly, among the structural elements described in the following embodiments, structural elements not recited in any one of the independent claims are described as arbitrary structural elements.

Also, the diagrams are schematic representations, and thus are not necessarily true to scale. Accordingly, for example, the scaling and the like are not necessary the same in the diagrams. Also, in the diagrams, structural elements that are substantially the same are given the same reference numerals, and a redundant description is omitted or simplified.

Also, in the specification of the present application, the terms that describe the relationship between elements, the terms that describe the shape of elements such as "rectangle" and "circle", and numerical value ranges are expressions that not only have a strict meaning, but also encompass a substantially equal range, for example, a margin of about several percent.

Embodiment

[Lighting System]

First, an overview of a lighting system according to an embodiment will be described with reference to FIG. 1. FIG. 1 is a diagram showing a usage state of lighting system 10 according to the present embodiment.

As shown in FIG. 1, lighting system 10 includes lighting device 100 and control device 200. Lighting device 100 and control device 200 are provided at positions that are spaced apart from each other, and connected to be cable of performing communication with each other via a network.

Lighting device 100 illuminates a plurality of regions 21 and 22 by projecting illumination light. Specifically, lighting device 100 can selectively illuminate only regions 21 and 22 in illumination light projection range 20.

Control device 200 controls lighting device 100. Specifically, control device 200 controls the shape, the position, the size, the color, the brightness, or the like of a lighting region to be illuminated by the illumination light projected from lighting device 100. Alternatively, control device 200 may control a time-varying factor related to at least one of the shape, the position, the size, the color, or the brightness of the lighting region. Control device 200 is, for example, a mobile terminal such as a smartphone or a tablet terminal. Control device 200 may be an operating terminal fixed to the wall or the like, a stationary computer, or the like.

Control device 200 receives an operation input from user 30, generates a control command based on the received operation input, and transmits the generated control command to lighting device 100. Lighting device 100 illuminates the plurality of regions 21 and 22 by projecting illumination light based on the control command. For example, in response to user 30 operating control device 200, the shape, the position, the size, the color, the brightness, or the like of region 21 or 22 can be dynamically changed according to the operation. It is also possible to change an aspect of time change (for example, a period of periodic variation or the like) related to at least one of the shape, the position, the size, the color, or the brightness of region 21 or 22. Addition or removal of a lighting region is also possible.

Although details will be described later, in the present embodiment, the control command acquired by lighting device 100 includes pair information that includes: a tag that indicates a parameter of the illumination light; and a specific value of the parameter indicated by the tag. By using the tag, the amount of data of the control command can be reduced. Also, by enabling addition and change of the parameter indicated by the tag, the flexibility to change of lighting regions can be enhanced.

[Lighting Device]

Next, a specific configuration of lighting device 100 according to the present embodiment will be described with reference to FIGS. 2 and 3, and also to FIG. 1 as appropriate.

Figure 2:
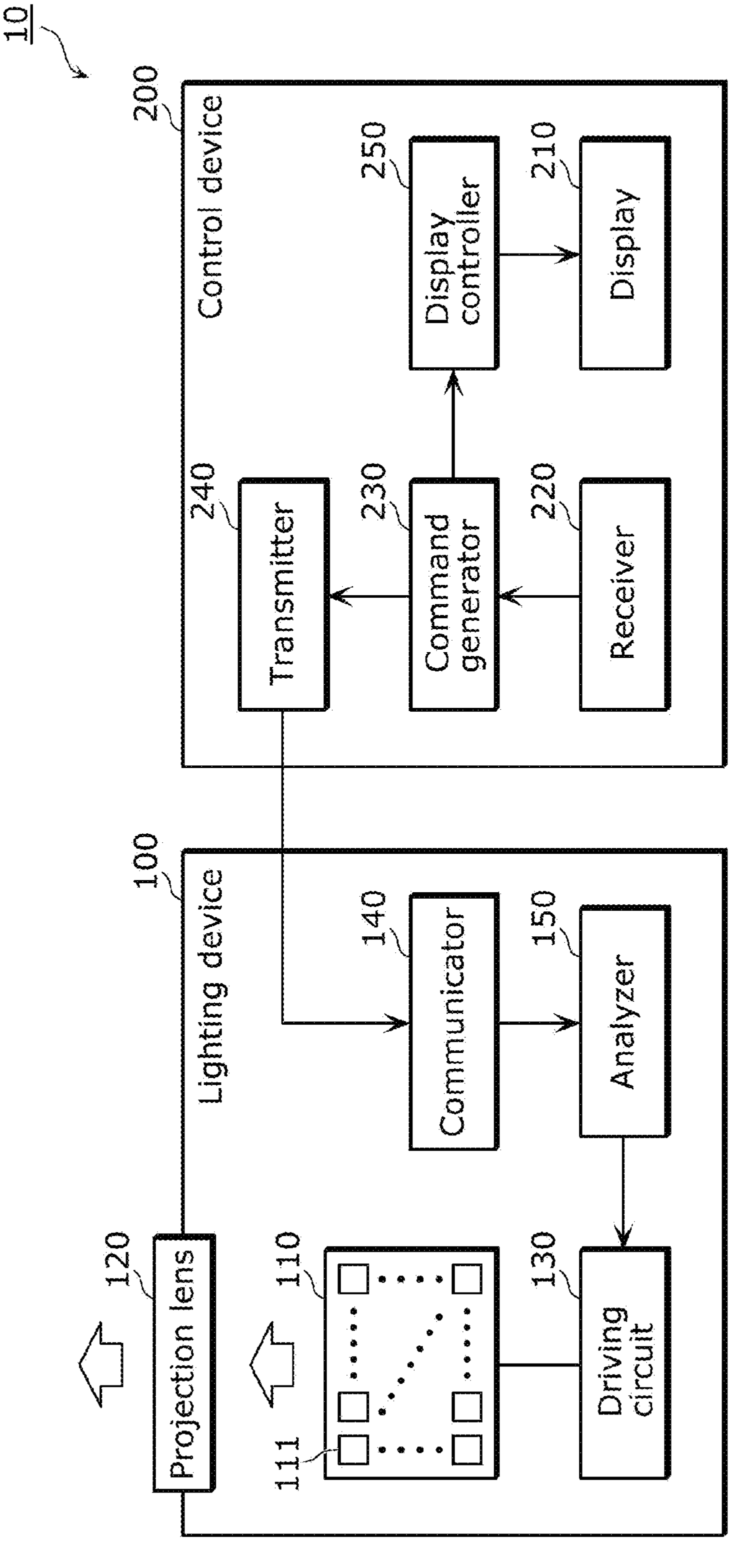
FIG. 2 is a block diagram showing a configuration of the lighting system according to the embodiment.
Figure 3:
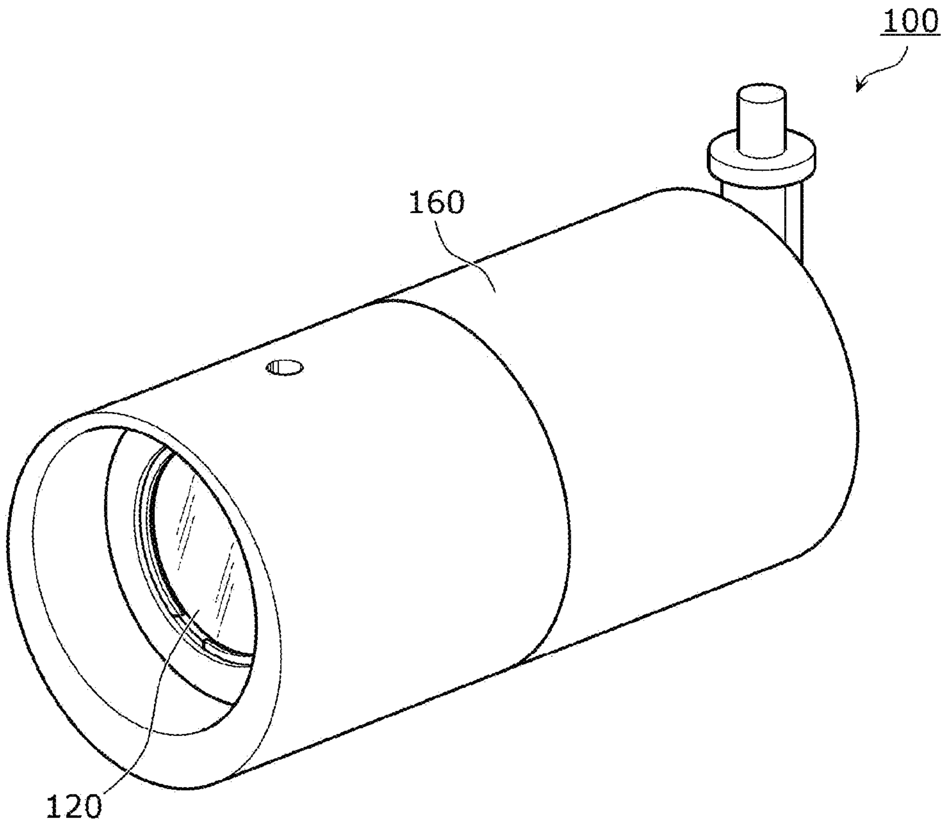
FIG. 3 is a schematic perspective view of the lighting device according to the embodiment.

FIG. 2 is a block diagram showing a configuration of lighting system 10 according to the present embodiment. FIG. 3 is a schematic perspective view of lighting device 100 according to the present embodiment.

As shown in FIG. 2, lighting device 100 includes light source 110, projection lens 120, driving circuit 130, communicator 140, and analyzer 150. Also, as shown in FIG. 3, lighting device 100 includes casing 160.

Light source 110 includes a plurality of light emitting elements 111 arranged in a two-dimensional array. Light source 110 emits light (visible light) by being driven by driving circuit 130. Specifically, the plurality of light emitting elements 111 are controlled to be switched on to illuminate and off to extinguish independently of each other by driving circuit 130. For example, driving circuit 130 can switch on only light emitting elements 111 that are required to illuminate regions 21 and 22 to illuminate, and switch off light emitting elements 111 that are not required to illuminate regions 21 and 22 to extinct. With this configuration, it is possible to reduce power consumption.

For example, by switching on all of light emitting elements 111 that are included in a circular range of a predetermined size to illuminate out of the plurality of light emitting elements 111 arranged in a two-dimensional array, illumination light for illuminating the circular region is projected via projection lens 120. Also, for example, by switching on all of light emitting elements 111 that are included in two circular ranges that do not overlap each other to illuminate, illumination light can be projected from projection lens 120 to illuminate regions 21 and 22 as shown in FIG. 1. That is, the outer shape of an illumination range in which a plurality of light emitting elements 111 arranged in a two-dimensional array are included forms the shape of a lighting region illuminated by illumination light. In the case where all of the plurality of light emitting elements 111 arranged in a two-dimensional array are switched on to illuminate, the lighting region is projection range 20 shown in FIG. 1.

The plurality of light emitting elements 111 are μLEDs. As used herein, the term "μLED" refers to a micro LED with a size of 100 μm×100 μm or less.

The μLEDs emit light due to the electric current supplied from driving circuit 130. Each μLED includes a blue LED and a yellow phosphor provided on the light emission side of the blue LED. The yellow phosphor is excited by a portion of blue light emitted from the blue LED, and emits yellow light. The μLED emits white light as mixed light of blue light and yellow light.

The plurality of light emitting elements 111 are mounted on a substrate. The substrate is a rigid substrate, but may be a flexible substrate. A pattern wiring for electrically connecting each of the plurality of light emitting elements 111 to driving circuit 130 is formed on the substrate.

The plurality of light emitting elements 111 are arranged in a 256×256 array within a planar region of a predetermined size on the substrate. The planar region in which light emitting elements 111 are arranged is, for example, a 3 mm×3 mm rectangular region. The number of light emitting elements 111 and the size of the region in which light emitting elements 111 are arranged are merely an example, and thus are not particularly limited thereto. By arranging a plurality of light emitting elements 111 in a small region, it is possible to achieve miniaturization of projection lens 120 or improve light intake efficiency.

Also, light source 110 has an illumination intensity adjustment function and an illumination color adjustment function. For example, each of the plurality of light emitting elements 111 can change the light emission intensity according to the amount of electric current supplied from driving circuit 130. Also, for example, the plurality of light emitting elements 111 may include a plurality of types of μLEDs that emit white light with different color temperatures. By adjusting the light emission intensity levels of the plurality of types of μLEDs, light source 110 can emit white light with a desired color temperature.

The plurality of light emitting elements 111 may include a red LED that emits red light, a green LED that emits green light, and a blue LED that emits blue light. With this configuration, light source 110 can also emit color lights other than white light.

Projection lens 120 projects light emitted from light source 110 driven by driving circuit 130 as illumination light. Projection lens 120 is composed of a plurality of lenses, but may be composed of only one lens.

Driving circuit 130 drives light source 110. Specifically, driving circuit 130 controls light illumination, light extinction, light emission intensity, and the like of each of the plurality of light emitting elements 111. Driving circuit 130 is implemented by, for example, an application-specific integrated circuit (ASIC). Driving circuit 130 supplies a pulse-width modulated (PWM) current to each of the plurality of light emitting elements 111. By adjusting the pulse width of the supplied current for each light emitting element 111, the light emission intensity of light emitting element 111 can be changed, and the illumination intensity adjustment function can be implemented. There is no particular limitation on the method for illumination intensity adjustment, and amplitude modulation, phase modulation, or the like can be used.

In the present embodiment, driving circuit 130 drives light source 110 based on a control command acquired by communicator 140. Specifically, driving circuit 130 adjusts the electric current supplied to each of the plurality of light emitting elements 111 based on a result of analysis of the control command performed by analyzer 150.

Communicator 140 acquires a control command by communicating with control device 200. A specific example of the control command will be described later.

Communicator 140 performs wireless communication with control device 200. Specifically, communicator 140 performs communication with control device 200 via Bluetooth Low Energy (BLE (registered trademark)). Communicator 140 is implemented by, for example, an antenna and a wireless processing circuit that processes a signal received by the antenna.

Analyzer 150 is a decoder that analyzes the control command. Specifically, analyzer 150 analyzes the control command to acquire, as a result of analysis, information regarding light illumination, light extinction, and light emission intensity of each of the plurality of light emitting elements 111, and outputs the result of analysis to driving circuit 130. For example, the light emission intensity can be expressed as an 8-bit numerical value in a range of 0% (extinction) to 100% (illumination at the highest light emission intensity). Analyzer 150 outputs, for each row of the plurality of light emitting elements 111, array data that includes data of light emission intensity of each light emitting element 111 expressed in an 8-bit format, as the result of analysis. Driving circuit 130 controls the plurality of light emitting elements 111 based on the array data output from analyzer 150.

Analyzer 150 is implemented by, for example, a large scale integration (LSI) that is an integrated circuit (IC). The integrated circuit is not limited to an LSI, and may be a dedicated circuit or a general-purpose processor. For example, analyzer 150 may be a microcontroller. Analyzer 150 includes, for example, a non-volatile memory in which a program is stored, a volatile memory that is a temporary storage area for executing the program, an input/output port, a processor for executing the program, and the like. Also, analyzer 150 may be a field programmable gate array (FPGA) that can be programmed or a reconfigurable processor that enables reconfiguration of the connection and setting of circuit cells in the LSI. The functions of analyzer 150 may be implemented by software or hardware.

Casing 160 houses light source 110, projection lens 120, driving circuit 130, communicator 140, and analyzer 150. Casing 160 includes, for example, an outer contour casing that forms the outer contour of lighting device 100 and a plurality of components such as a heat sink. However, the configuration is not limited thereto. The components that constitute casing 160 are made using a resin or a metal. Communicator 140 and analyzer 150 may be provided outside of casing 160. For example, analyzer 150 may be provided in a computer device, such as a server, that is connected to be capable of performing communication via communicator 140, or may be provided in control device 200.

Casing 160 has an opening portion on the light emission side (in the normal direction of the main surface of the substrate) of light source 110, and projection lens 120 is disposed to close the opening portion. Unlike ordinary projectors, it is unnecessary to provide a liquid crystal device or a digital mirror device (DMD) in casing 160, and thus the miniaturization of lighting device 100 can be achieved.

In the present embodiment, lighting device 100 is, for example, a spotlight, and is attached to wiring equipment (for example, a wiring duct or a hanging ceiling) provided on the ceiling or a wall. Lighting device 100 may be a downlight, a ceiling light, or the like.

The illumination light projected from projection lens 120 of lighting device 100 configured as described above illuminates, the plurality of regions 21 and 22 as shown in FIG. 1. At this time, out of the plurality of light emitting elements 111 included in light source 110, only some of the plurality of light emitting elements 111 are switched on to illuminate, and the remaining light emitting elements 111 are switched off to extinct. For example, out of the plurality of light emitting elements 111, only light emitting elements 111 that are included in two circular ranges that are spaced apart from each other are switched on to illuminate, and the remaining light emitting elements 111 are switched off to extinct. In this way, only two circular regions 21 and 22 can be illuminated. That is, by adjusting the position, the shape, and the size of a range (illumination range) that includes light emitting elements 111 to be illuminated out of the plurality of light emitting elements 111 included in light source 110, the position, the shape, and the size of a region (lighting region) to be illuminated by illumination light can be adjusted. Also, by adjusting the light emission intensity of light emitting elements 111 that are included in the illumination range, the brightness and the color of the lighting region can be adjusted.

As described above, with lighting device 100 according to the present embodiment, the plurality of regions 21 and 22 can be illuminated using only one lighting device (lighting fixture). Also, by switching off light emitting elements 111 that are not required for illumination, the power consumption can be reduced.

Here, an example was described in which regions 21 and 22 have a circular shape, but the shape of regions 21 and 22 is not limited thereto. The shape of regions 21 and 22 may be a predetermined geometric shape such as a rectangle, a square, a triangle, a polygon, or an ellipse. Alternatively, regions 21 and 22 may be in the shape of a number, a letter, a character, a sign, or the like. By changing the shape of the illumination range of the plurality of light emitting elements 111 arranged in a two-dimensional array to a geometric shape, a number, a letter, a character, or a sign, the shape of the lighting region can be changed to the geometric shape, the number, the letter, the character, or the sign.

[Control Device]

Next, control device 200 according to the present embodiment will be described with reference to FIG. 2.

As shown in FIG. 2, control device 200 includes display 210, receiver 220, command generator 230, transmitter 240, and display controller 250.

Display 210 displays an input screen for the user to input parameters of the illumination light in a web browser. Display 210 is implemented by, for example, a liquid crystal display panel, an organic electroluminescent (EL) display panel, or the like.

The input screen is a user interface (UI) implemented using a hypertext markup language (HTML) component. The input screen includes objects that can be operated by user 30 to input parameters of the illumination light. A specific example of the input screen will be described later.

The web browser is a software application for browsing websites via the Internet such as, for example, Microsoft Edge (registered trademark), Google Chrome (registered trademark), or Safari (registered trademark).

Receiver 220 receives an input to the input screen. Specifically, receiver 220 receives a specific value for each parameter of the illumination light input from user 30. Receiver 220 is implemented by, for example, a touch sensor or the like.

Command generator 230 generates a control command based on the input to the input screen. Specifically, command generator 230 converts the input received by receiver 220 into information in Javascript Object Notation (JSON) format. HTML is compatible with JSON, and thus the information conversion can be performed with a small amount of computation. Command generator 230 may use Scalable Vector Graphics (SVG) format instead of JSON format. A specific example of the control command will be described later.

Command generator 230 includes, for example, a non-volatile memory in which a program is stored, a volatile memory that is a temporary storage area for executing the program, an input/output port, a processor for executing the program, and the like. The functions of command generator 230 may be implemented by software or hardware.

Transmitter 240 transmits the control command generated by command generator 230. Specifically, transmitter 240 performs communication with communicator 140 of lighting device 100 via BLE. Transmitter 240 is implemented by, for example, an antenna and a wireless processing circuit that processes a signal received by the antenna.

Display controller 250 controls the display content displayed in the input screen on display 210. Specifically, display controller 250 changes objects in the input screen that can be operated by user 30 according to the operation of user 30 based on the input received by receiver 220.

Display controller 250 includes, for example, a non-volatile memory in which a program is stored, a volatile memory that is a temporary storage area for executing the program, an input/output port, a processor for executing the program, and the like. The functions of display controller 250 may be implemented by software or hardware. Display controller 250 may be implemented by the same hardware as the hardware that implements command generator 230.

[Input Screen]

Next, an example of the input screen that can be operated by user 30 will be described with reference to FIG. 4.

Figure 4:
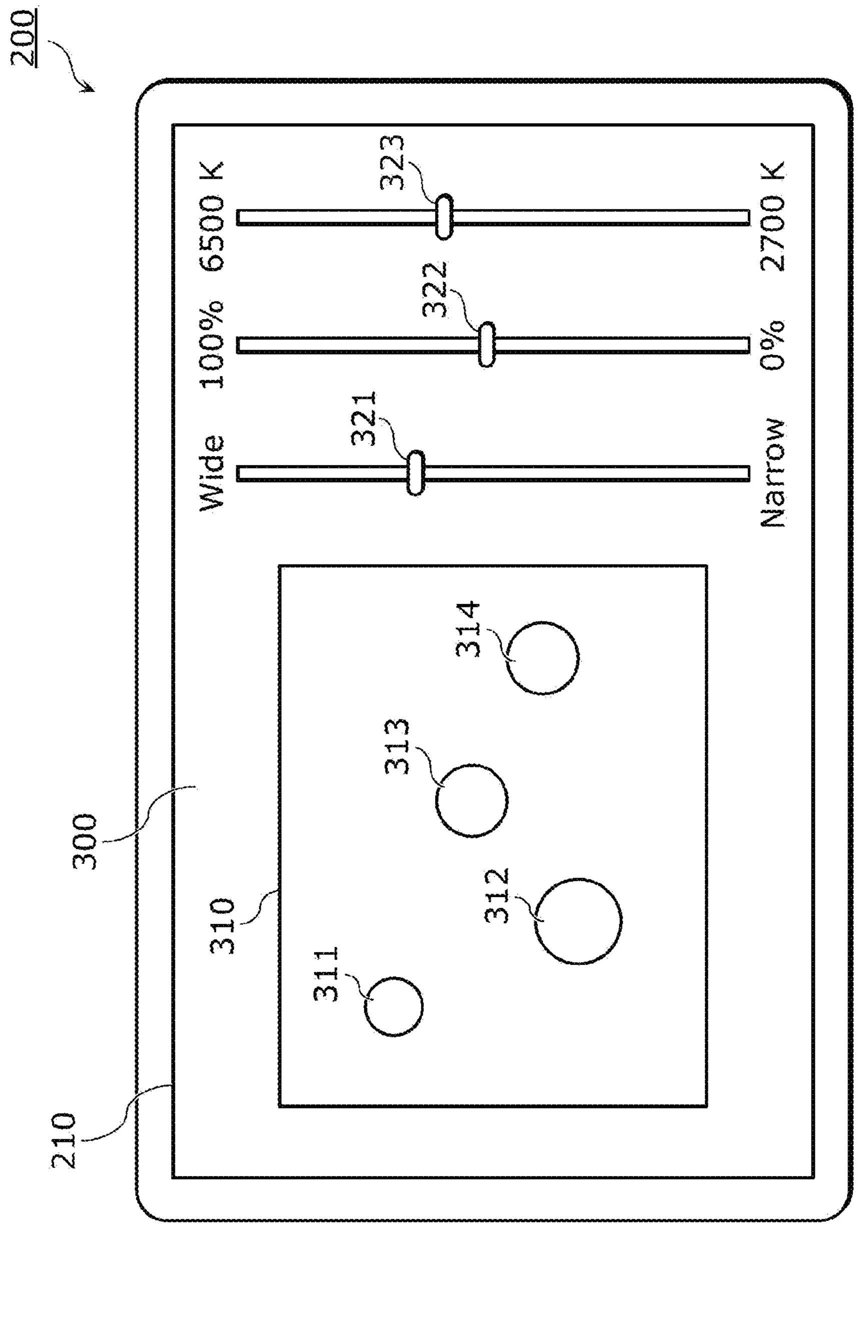
FIG. 4 is a diagram showing an example of an input screen displayed on a display included in a control device according to the embodiment.

FIG. 4 is a diagram showing an example of input screen 300 displayed on display 210 included in control device 200 according to the present embodiment.

As shown in FIG. 4, input screen 300 includes a plurality of lighting objects 311, 312, 313, and 314, size adjustment object 321, brightness adjustment object 322, and color adjustment object 323. The plurality of lighting objects 311, 312, 313, and 314, size adjustment object 321, brightness adjustment object 322, and color adjustment object 323 are graphical user interface (GUI) objects that can be operated by user 30.

Lighting objects 311, 312, 313, and 314 correspond to lighting regions to be illuminated by the illumination light. For example, each of lighting objects 311, 312, 313, and 314 can be moved within lightable range 310 through a drag operation performed by user 30. Lightable range 310 corresponds to, for example, projection range 20 shown in FIG. 1. The position of each of lighting objects 311, 312, 313, and 314 within lightable range 310 corresponds to the position of a lighting region in projection range 20. For example, lighting object 311 corresponds to region 21 shown in FIG.

1. Along with the movement of lighting object 311 performed by user 30, the position of region 21 is also moved.

Also, the shape, the size, the light emission intensity, and the light emission color of lighting object 311 represent the shape, the size, the brightness, and the color of the corresponding lighting region. The same applies to each of lighting objects 312, 313, and 314. With this configuration, the shape of a lighting region can be visually clearly shown on input screen 300, and thus the level of user convenience can be enhanced.

For example, lighting object 311 has a circular shape, from which it can be seen that the corresponding lighting region (for example, region 21) also has a circular shape. For example, in the example shown in FIG. 4, lighting object 312 is larger in size than lighting objects 311, 313, and 314, from which it can be seen that the lighting region that corresponds to lighting object 312 is larger in size than the lighting regions that correspond to lighting objects 311, 313, and 314.

Lighting objects 311, 312, 313, and 314 are selectable by user 30. For example, when lighting object 311 is selected through a touch operation or a click operation, size adjustment object 321, brightness adjustment object 322, and color adjustment object 323 serve as objects for adjusting the size, the brightness, and the color of the lighting region that corresponds to lighting object 311.

Size adjustment object 321 is a GUI object for adjusting the size of an irradiation region to be irradiated with illumination light. In this example, the lighting regions have a circular shape, and thus the size of the irradiation regions can be indicated by, for example, the diameter of the circular shape. Size adjustment object 321 is a slider, but the configuration is not limited thereto. Size adjustment object 321 may be a text box that allows the user to directly input a numerical value indicating the size of the irradiation region, a list of radio buttons or a dropdown list that allows the user to select from among a plurality of preset options, or the like. When size adjustment object 321 is operated, the size of the corresponding lighting object (for example, lighting object 311) is also changed according to the operation.

Brightness adjustment object 322 is a GUI object for adjusting the brightness of the irradiation region to be irradiated with illumination light. Brightness adjustment object 322 is a slider, but the configuration is not limited thereto. As with size adjustment object 321, brightness adjustment object 322 may also be a text box, a list of radio buttons, a dropdown list, or the like. When brightness adjustment object 322 is operated, the light emission intensity of the corresponding lighting object (for example, lighting object 311) is also changed according to the operation.

Color adjustment object 323 is a GUI object for adjusting the color temperature of the irradiation region to be irradiated with illumination light. Color adjustment object 323 is a slider, but the configuration is not limited thereto. As with size adjustment object 321, color adjustment object 323 may be a text box, a list of radio buttons, a dropdown list, or the like. When color adjustment object 323 is operated, the light emission color of the corresponding lighting object (for example, lighting object 311) is also changed according to the operation. In the case where light source 110 of lighting device 100 is configured to emit color lights other than white light, color adjustment object 323 may include GUI objects corresponding to RGB colors.

Input screen 300 may include a shape adjustment object for adjusting the shape of the lighting region to be illuminated by the illumination light. For example, the shape adjustment object may be a list of radio buttons or a dropdown list that allows the user to select a geometric shape such as a circle, an ellipse, a square, a rectangle, or a triangle, or select a number, a letter, or a character. Alternatively, the shape adjustment object may be a text box that allows the user to input a geometric shape, a number, a letter, or a character.

Depending on the shape of the lighting region, size adjustment object 321 may include a plurality of GUI objects. For example, in the case where the lighting region has a triangular shape, size adjustment object 321 may include a GUI object for adjusting the length of the base, a GUI object for adjusting the length of the height, and a GUI object for adjusting the size of the vertex angle.

Also, the size of the lighting region may be adjusted by directly operating lighting object 311. Specifically, lighting object 311 may have a function similar to that of the size adjustment object. For example, the size of the lighting region may be reduced or enlarged by performing a pinch-in operation or a pinch-out operation on lighting object 311. Also, lighting object 311 may be configured to be rotated. The same applies to each of lighting objects 312, 313, and 314.

When user 30 has operated the GUI objects on input screen 300, illumination light that is actually emitted from lighting device 100 is changed according to the operation input from user 30. That is, in response to user 30 performing an operation, the lighting region is changed. By reducing a time difference between the operation and the change of the lighting region, control device 200 that has excellent operability and a high level of user convenience can be achieved. In the present embodiment, the amount of data required for communication is reduced by reducing the information amount of the control command generated based on the input operation, and thus the operability can be enhanced.

An operation input to each GUI object is received by receiver 220. Receiver 220 may be a microphone, and receive a voice input. User 30 may operate each GUI object by voice.

A specific example of display displayed on input screen 300 is not limited to the example shown in FIG. 4. The arrangement of the objects can be changed. Also, input screen 300 may also include a GUI object with a function other than those described above. For example, input screen 300 may include a button for adding a lighting region or a button for removing a lighting region.

Also, for example, a new lighting region may be added by simply performing a predetermined operation (for example, a click (touch) operation, a double-click operation, or a hold-down operation) at a location in lightable range 310 where lighting objects 311, 312, 313, and 314 are not present. Also, when a predetermined operation (a hold-down operation, a right-click operation, or the like) is performed on any one of lighting objects 311, 312, 313, or 314, an option for removing the selected lighting object (lighting region) may be displayed.

[Control Command]

Next, the control command acquired by lighting device 100 will be described with reference to FIG. 5.

Figure 5:
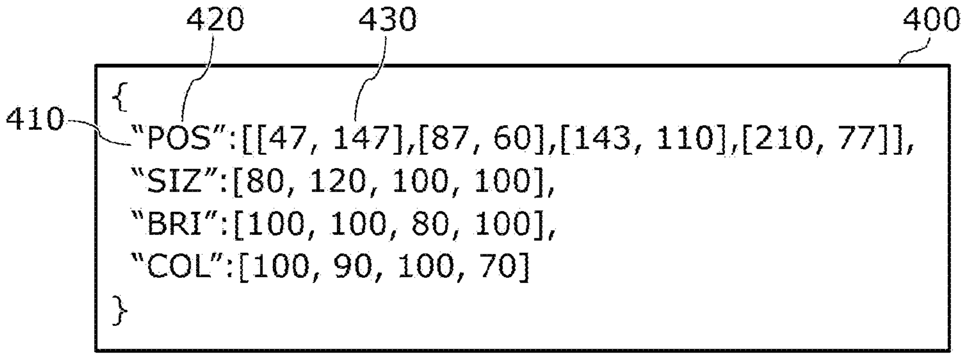
FIG. 5 is a diagram showing an example of a control command acquired by the lighting device according to the embodiment.

FIG. 5 is a diagram showing control command 400 acquired by lighting device 100 according to the present embodiment. Here, control command 400 shown in FIG. 5 shows an operation state of lighting objects 311, 312, 313, and 314 shown in FIG. 4. Specifically, control command 400 includes control information when four lighting regions are to be illuminated by illumination light. Control command 400 is generated by command generator 230, and transmitted to lighting device 100 by transmitter 240.

As shown in FIG. 5, control command 400 includes pair information 410. Specifically, control command 400 includes pair information 410 for each parameter of illumination light. The parameters are the shape, the position, the size, the color, and the brightness of the lighting region to be illuminated by illumination light. Each of the plurality of pair information 410 includes tag 420 that indicates a parameter of illumination light and specific value 430 of the parameter indicated by tag 420.

Pair information 410 is written in JSON format. Specifically, a plurality of specific values 430 are associated with tag 420. The number of specific values 430 corresponds to the number of lighting regions to be illuminated by illumination light. In the example shown in FIG. 5, four specific values 430 are arranged in an array. The four specific values 430 respectively correspond to, for example, lighting objects 311, 312, 313, and 314 from the head of the array.

"POS" is one of the parameters, and indicates the position of the lighting region. The position of the lighting region is represented by a set of center coordinates (x coordinate and y coordinate) of the circular lighting region. For example, specific value [47, 147] at the head of the array indicates that the center coordinates of lighting object 311 is (47, 147).

"SIZ" is one of the parameters, and indicates the size of the lighting region. The size of the lighting region is represented by the diameter of the circular lighting region. For example, specific value "80" at the head of the array indicates that the diameter of lighting object 311 is 80.

"BRI" is one of the parameters, and indicates the brightness of the lighting region. For example, specific value "100" at the head of the array indicates that the light emission intensity of lighting object 311 (the brightness in the lighting region) is 100%.

"COL" is one of the parameters, and indicates the color of the lighting region. The color of the lighting region is represented by a settable color temperature in a range of, for example, 2700 K or more and 6500 K or less. In FIG. 5, 2700 K, which is the lowest color temperature, is defined as "0", and 6500 K, which is the highest color temperature, is defined as "100". For example, specific value "100" at the head of the array indicates that the color temperature of lighting object 311 is 6500 K.

Control command 400 shown in FIG. 5 is generated assuming that the lighting region has a circular shape. Accordingly, control command 400 does not include a tag that indicates the shape of the lighting region. In the case where the lighting region has a shape such as an elongated rectangle, a square, or a rectangle, control command 400 may include tag 420 that indicates the shape of the lighting region and specific value 430 of the shape. In this case, specific value 430 is, for example, a string of letters ("rectangle" or the like) that indicates a shape. Alternatively, specific value 430 may be an identification number that indicates one of a plurality of shapes determined in advance.

In the case where the lighting region has a shape other than a circle, the method for representing the position and the size can be changed. For example, the position and the size can be represented collectively by the coordinates of the vertices of a polygon. Alternatively, the position can be represented by the coordinates of the centroid of a polygon (in particular, a rectangle, a square, or a regular polygon) and the inclination angle from the normal position. As used herein, the term "normal position" refers to, for example, an orientation in which one side of the polygon is parallel to the x axis (the horizontal axis of lightable range 310).

In the case where the shape of the lighting region is a letter, a string of letters may be included as specific value 430. For example, in the case where a string of letters such as "AB" is included as specific value 430, the shape of the lighting region can be represented by the letters "AB". The letters that can be used to represent the shape of the lighting region are not limited to alphabets and numbers, and may be kanji, hiragana, or katakana characters, signs such as an arrow, or the like.

As described above, by using pair information 410 that includes tag 420 and specific value 430, the shape, the position, the size, the brightness, and the color of the lighting region can be represented with a small amount of information. Accordingly, the amount of data of the control command transmitted to lighting device 100 can be reduced. Also, addition and removal of pair information 410 are possible. For example, by adding tag 420 that indicates a new parameter, the lighting region can be illuminated in a complicated letter shape or the like. As described above, the flexibility to change of lighting regions can be enhanced.

Control command 400 is generated every time user 30 performs an input operation on input screen 300. At this time, sequentially generated control commands 400 may include only a difference from the immediately preceding control command. With this configuration, the amount of data required for communication can be further reduced.

Figure 6A:
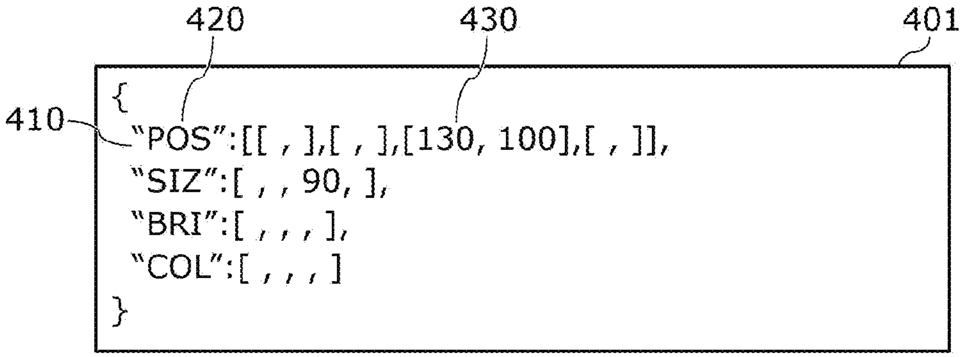
FIG. 6A is a diagram showing another example of a control command acquired by the lighting device according to the embodiment.
Figure 6B:
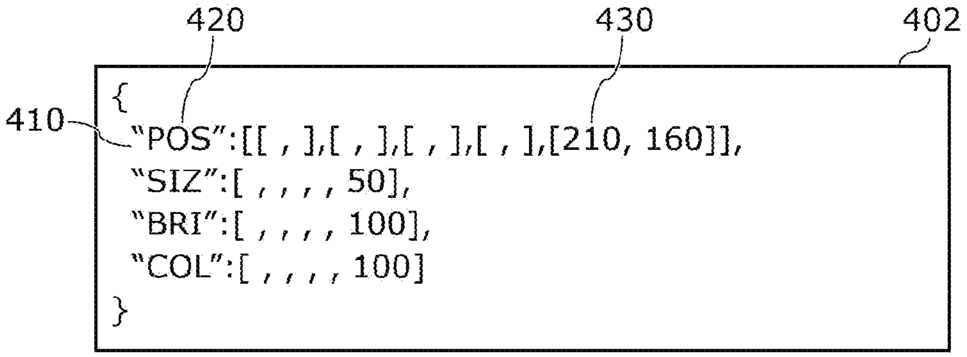
FIG. 6B is a diagram showing another example of a control command acquired by the lighting device according to the embodiment.

FIGS. 6A and 6B are diagrams showing other examples of data structures that are acquired by lighting device 100 according to the present embodiment.

In control command 401 shown in FIG. 6A, as specific values 430, only specific values changed from those of the immediately preceding control command are stored, and unchanged specific values are blank (null). For example, in control command 401, specific values are stored at the third position in the "POS" array and the third position in the "SIZ" array. From this, it can be seen that the position and the size of lighting object 313 have been changed, and the other parameters are unchanged and remain the same.

Also, in control command 402 shown in FIG. 6B, a set of values has been added at the fifth position of the POS array as specific value 430 of pair information 410. That is, control command 402 indicates that a new lighting region has been added.

In the case of removing an existing lighting region, for example, by changing specific value 430 in the brightness tag to 0, it may be determined that the lighting region has been removed. Alternatively, pair information 410 that includes tag 420 that is no longer needed may be removed. For example, control may be performed to carry out illumination at a predetermined default color temperature when the pair information that indicates "COL" tag has been removed.

Also, addition of new tag 420 is also possible. For example, tag 420 that indicates shape may be added to form a lighting region other than the circular lighting regions.

As described above, by using pair information 410 that includes tag 420 and specific value 430, the parameters of the illumination light can be easily added, removed, or changed. Even if future needs arise where complicated graphics, letters, or characters need to be expressed by illumination light, expansion can be easily achieved by addition of tag 420 or the like. As described above, a high level of flexibility to change of lighting regions can be achieved.

Each of the parameters may include a time-varying factor related to at least one of the shape, the position, the size, the color, or the brightness of the lighting region. The time-varying factor is an element that determines an aspect of a time change of at least one of the shape, the position, the size, the color, or the brightness. Specifically, the time-varying factor is the time at which the time change starts or ends or, a period of periodic time change, the amount of periodic variation, or the like.

For example, control device 200 may periodically change at least one of the shape, the position, the size, the color, or the brightness of the lighting region. Alternatively, control device 200 may include a timer, and may change at least one of the shape, the position, the size, the color, or the brightness of the lighting region into a predetermined pattern when a predetermined time comes. Also, control device 200 may shorten or extend the period of change with time in a day. Also, control device 200 may switch the illumination light to light with a different color that counters the sunlight and/or strong brightness during hours of strong sunlight, and switch the illumination light to light with the minimum illuminance and/or a gentle white color during hours of weak sunlight. As described above, control device 200 may operate based on a program that changes at least one of the shape, the position, the size, the color, or the brightness of the lighting region over time.

Also, regarding the change of light emission color over time, if it is necessary to inform people around of any emergency (a disaster, a fire or a robbery in the neighborhood, a carrier infrastructure communication failure), a configuration may be used that abruptly changes the light emission color to a color that is completely different such as a complementary color so as to attract the attention of the people around. Unless there is an urgent emergency situation, the light emission color is set to remain the same color as before such as gentle illumination or blinking so as to calm the people around.

[Control Method]

Next, a control method for controlling lighting device 100 according to the present embodiment will be described with reference to FIGS. 7 and 8.

Figure 7:
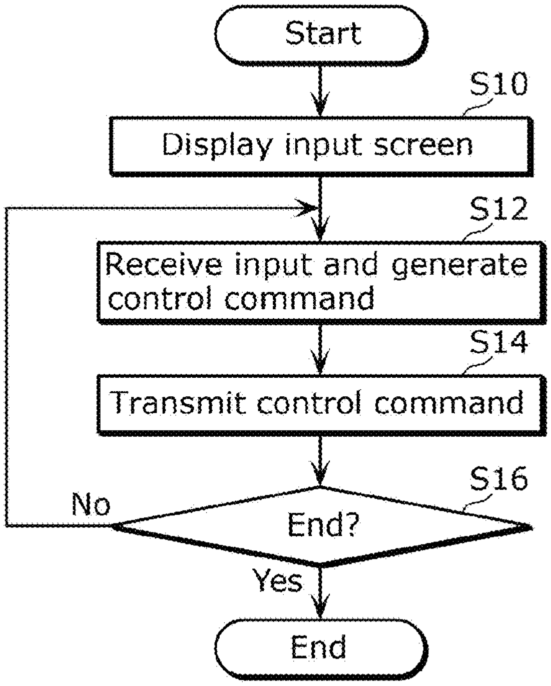
FIG. 7 is a flowchart illustrating an operation performed by the control device according to the embodiment.

FIG. 7 is a flowchart illustrating an operation performed by control device 200 according to the present embodiment.

As shown in FIG. 7, first, display 210 of control device 200 displays input screen 300 (S10). Input screen 300 is generated by display controller 250 and displayed in a web browser.

Next, receiver 220 receives an input from user 30, and command generator 230 generates control command 400 based on the received input (S12). After that, transmitter 240 transmits the generated control command 400 to lighting device 100 (S14).

Steps S12 and S14 are repeated until there is no longer input from user 30 (No in S16). In the repetition of these steps, in step S12, command generator 230 may generate control command 401 or 402. That is, command generator 230 may generate a control command that includes only a difference from the immediately preceding control command as the specific value.

When there is no longer input from user 30 (Yes in S16), control device 200 ends the processing.

Although not shown in FIG. 4, for example, input screen 300 may include an end button for ending control. When the end button is selected, it may be determined that the input operation has been finished. Alternatively, control device 200 may have a timer function, and determine that the input operation has been finished when a predetermined length of time passes after no operation input from user 30 is received.

Figure 8:
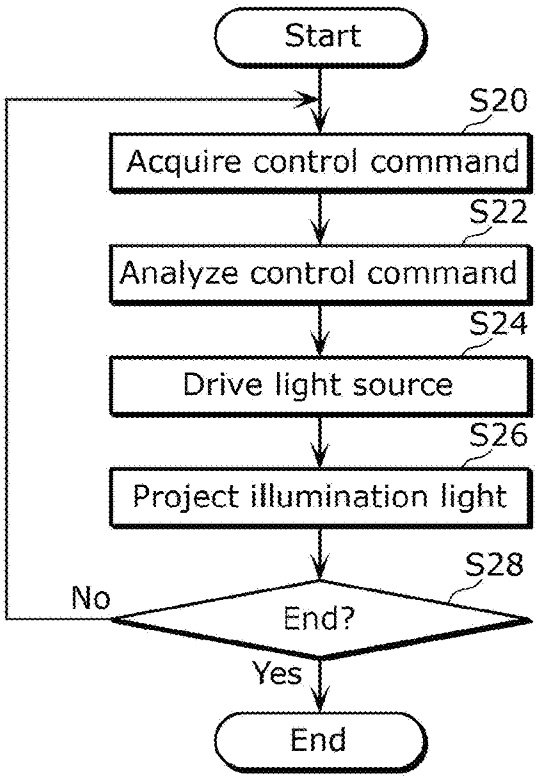
FIG. 8 is a flowchart illustrating an operation performed by the lighting device according to the embodiment.

FIG. 8 is a flowchart illustrating an operation performed by lighting device 100 according to the present embodiment.

As shown in FIG. 8, in lighting device 100, first, communicator 140 acquires control command 400 (S20). Next, analyzer 150 analyzes the acquired control command 400 (S22).

Next, driving circuit 130 drives light source 110 based on control command 400 (S24). Specifically, driving circuit 130 supplies, based on the result of analysis performed by analyzer 150, a desired electric current to light emitting elements 111 to be switched on to illuminate out of the plurality of light emitting elements 111. No electric current is supplied to light emitting elements 111 that are unnecessary to be switched on to illuminate.

Next, projection lens 120 projects light emitted from light emitting elements 111 illuminated by the supply of electric current as illumination light (S26). By doing so, lighting device 100 can illuminate a region that has the same shape as the outer shape of the illumination range in the two-dimensional array.

Steps S20 to S26 are repeated until lighting device 100 stops illuminating (No in S28). By performing the processing every time a control command is acquired, the lighting region can be changed dynamically according to the input from user 30.

Conclusion

As described above, a lighting device according to a first aspect of the present invention is, for example, lighting device 100 described above, and includes: light source 110 that includes a plurality of light emitting elements 111 arranged in a two-dimensional array; communicator 140 that acquires control command 400, 401 or 402 by communicating with control device 200; driving circuit 130 that drives light source 110 based on control command 400, 401 or 402 acquired by communicator 140; and projection lens 120 that projects light emitted from light source 110 driven by driving circuit 130 as illumination light. Control command 400, 401 or 402 includes pair information 410 that includes tag 420 that indicates a parameter of the illumination light and specific value 430 of the parameter indicated by tag 420. The parameter is any one of a shape, a position, a size, a color, or a brightness of a lighting region (for example, region 21 or 22) to be illuminated by the illumination light, or a time-varying factor related to at least one of the shape, the position, the size, the color, or the brightness of the lighting region to be illuminated by the illumination light.

With this configuration, by using pair information 410 that includes tag 420 and specific value 430, the amount of communication data required to control light source 110 can be further suppressed as compared with the case where data in a bitmap format is transmitted. Also, by adding, removing, or changing tag 420, the flexibility to change of lighting region can be enhanced.

Also, for example, a lighting device according to a second aspect of the present invention is the lighting device according to the first aspect, wherein communicator 140 communicates wirelessly with control device 200.

With this configuration, even if a situation occurs in which a large amount of data cannot be transmitted in a short time due to communication band limitation or the like, with the lighting device according to the present aspect, the amount of data can be reduced, and thus control of the lighting region can be performed smoothly.

Also, for example, a lighting device according to a third aspect of the present invention is the lighting device according to the second aspect, wherein communicator 140 communicates with control device 200 via BLE.

BLE enables communication with high power efficiency, but there is a limit to the amount of data that can be used in communication. With the lighting device according to the present aspect, the amount of data can be reduced, and thus control of the lighting region can be performed smoothly, while achieving energy saving brought about the use of BLE.

Also, for example, a lighting device according to a fourth aspect of the present invention is the lighting device according to any one of the first to the third aspects, wherein the illumination light is projected to a plurality of lighting regions, and pair information 410 includes tag 420 and specific value 430 for each of the plurality of lighting regions.

With this configuration, a plurality of specific values 430 can be collectively associated with one tag 420, and thus the amount of data can be further reduced.

Also, for example, a lighting device according to a fifth aspect of the present invention is the lighting device according to any one of the first to the fourth aspects, wherein control command 400, 401 or 402 includes the pair information for each of a plurality of parameters, each of which is the parameter defined in the first aspect.

With this configuration, a plurality of parameters can be controlled, and thus the lighting mode of the lighting region can be controlled in a more detailed manner.

Also, for example, a lighting device according to a sixth aspect of the present invention is the lighting device according to any one of the first to the fifth aspects, wherein pair information 410 is written in JSON format or SVG format.

JSON or SVG is compatible with HTML, and thus information conversion can be performed with a small amount of computation. Input screen 300 for receiving details of control can be generated using an HTML component. Input screen 300 generated using an HTML component can be displayed on a general-purpose application such as a web browser, and thus the need for a dedicated terminal can be eliminated, and the level of user convenience can be further enhanced.

Also, for example, a lighting device according to a seventh aspect of the present invention is the lighting device according to any one of the first to the sixth aspects, wherein the plurality of light emitting elements 111 are μLEDs.

With this configuration, the miniaturization of light source 110 can be achieved, and thus the miniaturization of the entire device can also be achieved.

Also, for example, a lighting system according to an eighth aspect of the present invention is, for example, lighting system 10 described above, and includes the lighting device according to any one of the first to the seventh aspects and control device 200.

With this configuration, as with lighting device 100 described above, the amount of communication data required to control light source 110 can be reduced, and a lighting system that is highly flexible to change of the lighting region can be achieved.

Also, for example, a lighting system according to a ninth aspect of the present invention is the lighting system according to the eighth aspect, wherein control device 200 includes: display 210 that displays input screen 300 for inputting the parameter; command generator 230 that generates a control command based on an input to input screen 300; and transmitter 240 that transmits the control command generated by command generator 230.

With this configuration, user 30 can easily control the lighting region by operating input screen 300.

Also, for example, a lighting system according to a tenth aspect of the present invention is the lighting system according to the ninth aspect, wherein display 210 displays input screen 300 in a web browser.

With this configuration, the input screen can be displayed in a web browser, and thus the need for the dedicated terminal can be eliminated, and the level of user convenience can be further enhanced.

Also, for example, a method for controlling a lighting device according to an eleventh aspect of the present invention includes the steps of: acquiring control command 400, 401 or 402 by communicating with control device 200; and causing driving circuit 130 to drive light source 110 based on the acquired control command 400, 401 or 402. Control command 400, 401 or 402 includes pair information 410 that includes tag 420 that indicates a parameter of the illumination light and specific value 430 of the parameter indicated by tag 420. The parameter is any one of a shape, a position, a size, a color, or a brightness of a lighting region to be illuminated by the illumination light, or a time-varying factor related to at least one of the shape, the position, the size, the color, or the brightness of the lighting region to be illuminated by the illumination light.

With this configuration, as with lighting device 100 described above, the amount of communication data required to control light source 110 can be reduced, and a method for controlling a lighting device that is highly flexible to change of the lighting region can be achieved.

(Others)

The lighting device, the lighting system, and the method for controlling a lighting device according to the present invention have been described above based on the embodiment given above and the like. However, the present invention is not limited to the embodiment given above.

For example, in the embodiment given above, an example was described in which light emitting elements 111 are μLEDs. However, the configuration is not limited thereto. Light emitting elements 111 may be ordinary size LEDs, organic EL elements, or laser elements.

Also, for example, light source 110 may have only either one of the illumination intensity adjustment function or the illumination color adjustment function. For example, the plurality of light emitting elements 111 can only be controlled to be switched on to illuminate and off to extinct, and the light emission intensity during illumination may always be set to a constant value.

Also, for example, control device 200 may control the illumination light emitted from lighting device 100 based on a predetermined control program. For example, command generator 230 of control device 200 may read out, from a memory, scene information that indicates a dynamic lighting scene in which at least one of the shape, the position, the size, the color, or the brightness of the lighting region to be illuminated by the illumination light changes over time, and convert the read-out scene information to a control command.

Also, for example, display 210 may display input screen 300 by activating a dedicated application for controlling lighting device 100, rather than a web browser.

Also, for example, the pair information included in the control command does not necessarily need to be written in JSON or SVG format. There is no particular limitation on the description format as long as the tag and the specific numerical value are paired in one-to-one correspondence or one-to-many correspondence in the pair information.

Also, for example, wireless communication between lighting device 100 and control device 200 may be performed using near-field communication such as ZigBee (registered trademark) or a wireless local area network (LAN). Alternatively, the wireless communication method (communication standard) may be communication via a wide area communication network such as the Internet. Also, instead of or in addition to wireless communication, wired communication may be performed between lighting device 100 and control device 200. The wired communication may be, specifically, power line communication (PLC), communication using a wired LAN, or the like.

Also, in the embodiment given above, a processing operation performed by a specific processor may be performed by a different processor. Also, the order of a plurality of processing operations may be changed, or a plurality of processing operations may be performed in parallel. Also, the assignment of the structural elements of lighting system 10 to a plurality of devices is merely an example. For example, the structural elements of one device may be included in a different device. Also, lighting system 10 may be implemented as a single device. That is, lighting device 100 and control device 200 may be a single integrated device in which lighting device 100 and control device 200 are held in one casing.

For example, the processing operations described in the embodiment given above may be performed by centralized processing using a single device (system), or by distributed processing using a plurality of devices. Also, the number of processors for executing the program may one or more. That is, centralized processing may be performed, or distributed processing may be performed.

Also, in the embodiment given above, all or some of the structural elements of the controller or the like may be implemented using dedicated hardware or may be implemented by executing a software program suitable for the structural elements. The structural elements may be implemented by a program executor such as a central processing unit (CPU) or a processor reading and executing a software program recorded in a recording medium such as a hard disk drive (HDD) or a semiconductor memory.

Also, the structural elements of the controller or the like may be composed of one or more electronic circuits. The one or more electronic circuits may be general-purpose circuits or dedicated circuits.

The one or more electronic circuits may include, for example, semiconductor devices, ICs, LSIs, or the like. The ICs or LSIs may be integrated on a single chip or a plurality of chips. Here, they are called ICs or LSIs, but may be called by different names depending on the degree of integration such as system LSI, very large scale integration (VLSI), or ultra large scale integration (ULSI). Also, an FPGA programmed after the production of LSIs may also be used for the same purpose.

Also, generic or specific aspects of the present invention may be implemented by a system, a device, a method, an integrated circuit, or a computer program. Alternatively, the aspects of the present invention may be implemented by a computer-readable non-transitory recording medium, such as an optical disk, a HDD, or a semiconductor memory, in which the computer program is stored. The aspects of the present invention may also be implemented by any combination of a system, a device, a method, an integrated circuit, a computer program, and a recording medium.

The present invention also encompasses other embodiments obtained by making various modifications that can be conceived by a person having ordinary skill in the art to the above-described embodiment as well as embodiments implemented by any combination of the structural elements and the functions of the above-described embodiment without departing from the scope of the present disclosure.

REFERENCE SIGNS LIST

10 lighting system
21, 22 region
100 lighting device
110 light source
111 light emitting element
120 projection lens
130 driving circuit
140 communicator
200 control device
210 display
230 command generator
240 transmitter
300 input screen
400, 401, 402 control command
410 pair information
420 tag
430 specific value

The invention claimed is:

1. A lighting device comprising:
a light source that includes a plurality of light emitting elements arranged in a two-dimensional array;
a communicator that acquires a control command by communicating with a control device;
a driving circuit that drives the light source based on the control command acquired by the communicator; and
a projection lens that projects light emitted from the light source driven by the driving circuit as illumination light,
wherein the control command includes a plurality of pair information items each including: a tag that indicates a parameter of the illumination light; and a specific value of the parameter indicated by the tag,
a parameter indicated by a tag of a first pair information item is a shape or a size of a lighting region to be illuminated by the illumination light, or a time-varying factor related to at least one of the shape or the size of the lighting region to be illuminated by the illumination light, the first pair information item being one of the plurality of pair information items,
a parameter indicated by a tag of a second pair information item is any one of a position, a color, or a brightness of the lighting region to be illuminated by the illumination light, or a time-varying factor related to at least one of the position, the color, or the brightness of the lighting region to be illuminated by the illumination light, the second pair information item being another one of the plurality of pair information items,
the plurality of light emitting elements are controlled to be switched on to illuminate and off to extinguish independently of each other by the driving circuit, and
out of the plurality of light emitting elements, an outer shape of an illumination range in which a plurality of light emitting elements that are simultaneously switched on to illuminate are included defines the shape of the lighting region illuminated by the illumination light.

2. The lighting device according to claim 1, wherein the communicator communicates wirelessly with the control device.

3. The lighting device according to claim 2, wherein the communicator communicates with the control device via Bluetooth Low Energy (BLE (registered trademark)).

4. The lighting device according to claim 1, wherein the illumination light is projected to a plurality of lighting regions, and the pair information includes the tag and the specific value for each of the plurality of lighting regions.

5. The lighting device according to claim 1, wherein the control command includes the pair information for each of a plurality of parameters, each of which is the parameter.

6. The lighting device according to claim 1, wherein the pair information is written in JavaScript Object Notation (JSON) format or Scalable Vector Graphics (SVG) format.

7. The lighting device according to claim 1, wherein the plurality of light emitting elements are micro light emitting diodes (μLEDs).

8. A lighting system comprising:
the lighting device according to claim 1; and
the control device.

9. The lighting system according to claim 8, wherein the control device includes:
- a display that displays an input screen for inputting the parameter;
- a command generator that generates a control command based on an input to the input screen; and
- a transmitter that transmits the control command generated by the command generator.

10. The lighting system according to claim 9, wherein the display displays the input screen in a web browser.

11. A method for controlling a lighting device, the lighting device including:
- a light source that includes a plurality of light emitting elements arranged in a two-dimensional array;
- a driving circuit that drives the light source; and
- a projection lens that projects light emitted from the light source driven by the driving circuit as illumination light, the method comprising:
- acquiring a control command by communicating with a control device; and
- causing the driving circuit to drive the light source based on the control command acquired, wherein the control command includes a plurality of pair information items each including: a tag that indicates a parameter of the illumination light; and a specific value of the parameter indicated by the tag, a parameter indicated by a tag of a first pair information item is a shape or a size of a lighting region to be illuminated by the illumination light, or a time-varying factor related to at least one of the shape or the size of the lighting region to be illuminated by the illumination light, the first pair information item being one of the plurality of pair information items, a parameter indicated by a tag of a second pair information item is any one of a position, a color, or a brightness of the lighting region to be illuminated by the illumination light, or a time-varying factor related to at least one of the position, the color, or the brightness of the lighting region to be illuminated by the illumination light, the second pair information item being another one of the plurality of pair information items, the plurality of light emitting elements are controlled to be switched on to illuminate and off to extinguish independently of each other by the driving circuit, and out of the plurality of light emitting elements, an outer shape of an illumination range in which a plurality of light emitting elements that are simultaneously switched on to illuminate are included defines the shape of the lighting region illuminated by the illumination light.

* * * * *